B. D. TABOR.
Cultivators.

No. 148,262. Patented March 3, 1874.

Witnesses:
P. C. Dieterich
G. Kiesecker

Inventors:
B. D. Tabor
per: T. H. Alexander
Attorney.

UNITED STATES PATENT OFFICE.

BYRON D. TABOR, OF WILSON, NEW YORK, ASSIGNOR TO HIMSELF AND C. D. TABOR, OF SAME PLACE.

IMPROVEMENT IN CULTIVATORS.

Specification forming part of Letters Patent No. 148,262, dated March 3, 1874; application filed January 29, 1874.

*To all whom it may concern:*

Be it known that I, BYRON D. TABOR, of Wilson, in the county of Niagara and State of New York, have invented certain new and useful Improvements in Cultivators; and I do hereby declare that the following is a full, clear, and exact description thereof, reference being had to the accompanying drawings and to the letters of reference marked thereon, which form part of this specification.

The nature of my invention consists in the construction and arrangement of a one-horse cultivator, as will be hereinafter more fully set forth.

In order to enable others skilled in the art to which my invention appertains to make and use the same, I will now proceed to describe its construction and operation, referring to the annexed drawing, in which—

Figure 1:
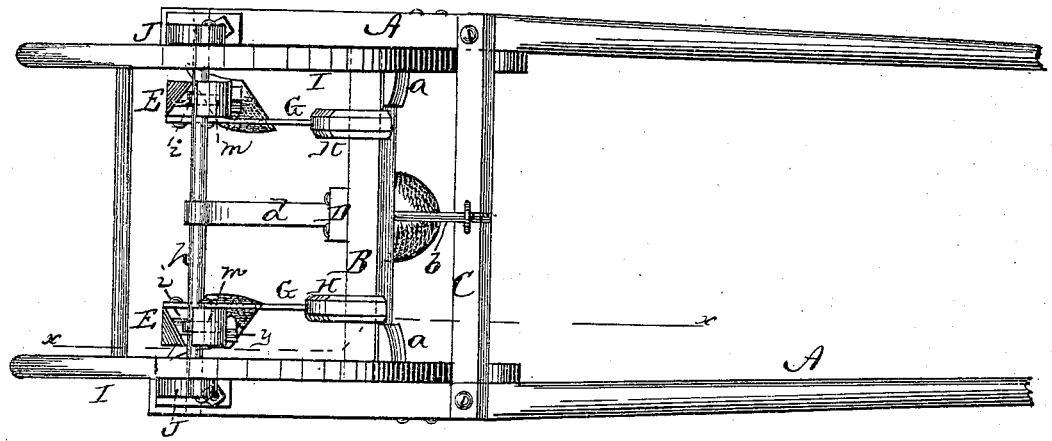
Figure 2:
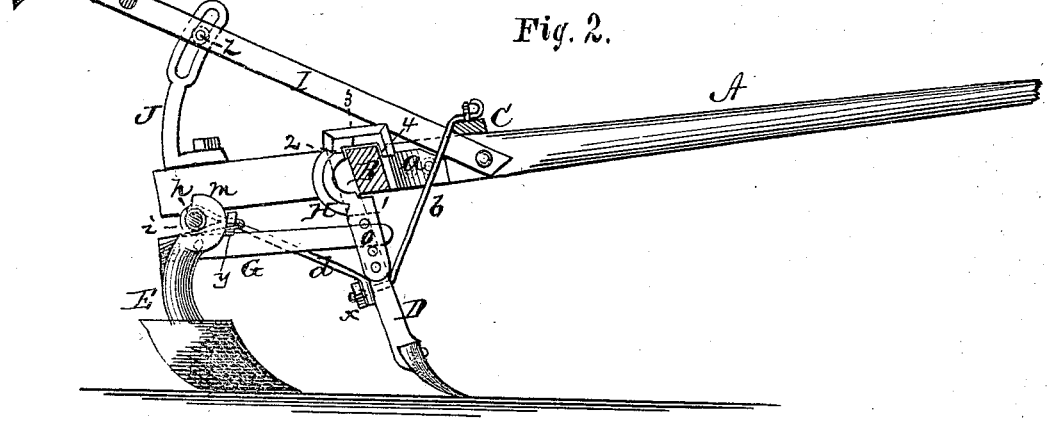

Figure 1 is a plan view, and Fig. 2 a longitudinal section of the same through the line $x$ $x$, Fig. 1.

A A represent the thills, connected with a cross-bar, B, by means of suitable angle-irons, $a$ $a$. In front of the cross-bar B is a bar, C, attached on top of the thills, and on this bar, in the center, is a loop through which passes a rod, $b$. The upper or front end of the rod $b$ is formed with a hook in which the whiffletree is attached, while the lower rear end passes through a plow-standard, D, which is firmly attached to the cross-bar B, and a nut, $x$, is screwed upon the end of the rod $b$ on the rear side of the standard. By this means the draft is applied directly to the center plow. This plow is further braced by means of a brace, $d$, the front end of which is placed on the rear end of the draft-rod $b$ and fastened by the nut $x$, while the rear end is passed around a shaft, $h$, having its bearings in suitable boxes under the rear ends of the thills A A. Upon the shaft $h$ are placed two plows, E E, one right hand and the other left hand, which are fastened and braced by the following means: The upper end of each plow-shank or stock forms a broad hook, $m$, which passes around the front of the shaft, as shown in Fig. 2. The shaft passes through an eye-screw, $i$, the shank of which passes through a hole in the hook $m$, and a nut, $y$, is screwed on the same on the front side of the hook, so as to clamp the shaft in the hook, or the hook against the shaft. To the side of each plow-shank is firmly attached a brace, G, the front end of which is adjusted and held in the lower forked end of a hooked clamp, H, placed on the cross-bar B. This clamp has a bearing, 1, on the under side of the cross-bar, a bearing, 2, on the rear side, 3 on the top, and 4 on the front, as shown in Fig. 2, so that the clamp can give neither backward nor forward, while it is capable of being moved laterally on the cross-bar. By adjusting the brace G up or down in the lower forked end of the clamp, the angle at which the points of the plows E are to work may be easily regulated. The plows may be adjusted outward or inward by loosening the nuts $y$ and moving them on the shaft, and the clamps on the cross-bar to the desired point, when the nuts $y$ are tightened again. I I are the handles, pivoted at their front ends, one to each thill A, in rear of or below the bar C, and these handles are fastened, at any angle desired, to slotted standards J J fastened on the rear ends of the thills. A set-screw, Z, passes through the slot in the standard into the handle, to hold the same at any height desired, whereby they may be adjusted to suit the height of the operator.

Having thus fully described my invention, what I claim as new, and desire to secure by Letters Patent, is—

1. The plow-shank E, formed with the broad hook $m$ at its upper end, in combination with the shaft $h$, eye-screw $i$, and nut $y$, substantially as and for the purposes herein set forth.

2. In a cultivator, the clamp H, constructed as shown, with bearings 1, 2, 3, and 4, on all four sides of the cross-bar B, preventing any forward or backward movement, but allowing it to move laterally on the bar, substantially as herein set forth.

In testimony that I claim the foregoing as my own, I affix my signature in presence of two witnesses.

B. D. TABOR.

Witnesses:
ELISHA WEST,
G. R. DUNLAP.